United States Patent
Horie et al.

(10) Patent No.: US 10,035,229 B2
(45) Date of Patent: Jul. 31, 2018

(54) PROCESSING APPARATUS AND PROCESSING METHOD

(75) Inventors: Tasuku Horie, Tokyo (JP); Shuho Tsubota, Tokyo (JP); Katsuya Sennyu, Tokyo (JP); Hiroshi Hara, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 868 days.

(21) Appl. No.: 14/127,828

(22) PCT Filed: Aug. 7, 2012

(86) PCT No.: PCT/JP2012/070102
§ 371 (c)(1),
(2), (4) Date: Dec. 19, 2013

(87) PCT Pub. No.: WO2013/021999
PCT Pub. Date: Feb. 14, 2013

(65) Prior Publication Data
US 2014/0137711 A1    May 22, 2014

(30) Foreign Application Priority Data
Aug. 11, 2011 (JP) .................. 2011-175939

(51) Int. Cl.
*B23Q 3/00* (2006.01)
*B23Q 3/06* (2006.01)
(Continued)

(52) U.S. Cl.
CPC .............. *B23Q 3/065* (2013.01); *B23B 5/00* (2013.01); *B23Q 3/088* (2013.01); *H05H 7/20* (2013.01); *Y10T 82/10* (2015.01); *Y10T 82/14* (2015.01)

(58) Field of Classification Search
CPC ........... H05H 7/20; B23Q 3/088; B23Q 3/065
See application file for complete search history.

(56) References Cited

U.S. PATENT DOCUMENTS 2,681,806 A * 6/1954 Barrus .................... B23B 31/36
279/112
2,887,833 A * 5/1959 Passarotti ............. B24B 41/066
451/367
(Continued)

FOREIGN PATENT DOCUMENTS

EP    1 871 150    12/2007
JP    3-117548    5/1991
(Continued)

OTHER PUBLICATIONS

Extended European Search Report dated Mar. 4, 2015 in corresponding European patent application No. 12822311.2.
(Continued)

*Primary Examiner* — Will Fridie, Jr.
(74) *Attorney, Agent, or Firm* — Wenderoth, Lind & Ponack, L.L.P.

(57) ABSTRACT

A processing apparatus and a processing method with which an object-to-be-cut is processed, and a high-precision superconducting acceleration cavity can be formed. The processing apparatus forming a half cell by processing a hollow workpiece, and is provided with a securing jig, a rotational drive portion rotating the securing jig, and a cutting tool. The securing jig having a plurality of members, when cutting a first portion-to-be-cut of the workpiece, the plurality of members are combined in a first pattern so that the first portion-to-be-cut is exposed, when cutting a second portion-to-be-cut of the workpiece, the plurality of members are combined in a second pattern so that the second portion-to-be-cut is exposed, and the combination of the plurality of
(Continued)

members is changed from the first pattern to the second pattern without removing the workpiece.

4 Claims, 11 Drawing Sheets

(51) Int. Cl.
*H05H 7/20* (2006.01)
*B23B 5/00* (2006.01)
*B23Q 3/08* (2006.01)

(56) References Cited

U.S. PATENT DOCUMENTS

| | | | |
|---|---|---|---|
| 5,239,157 A * | 8/1993 | Sakano | B23K 26/20 219/121.64 |
| 5,291,692 A | 3/1994 | Takahashi et al. | |
| 5,500,995 A * | 3/1996 | Palmieri | H05H 7/20 29/599 |
| 5,749,274 A * | 5/1998 | Chiba | B23B 3/24 82/1.11 |
| 6,224,467 B1 * | 5/2001 | Tanaka | B24B 13/005 451/388 |
| 9,352,416 B2 * | 5/2016 | Khare | B23K 26/0823 |
| 2002/0197122 A1 * | 12/2002 | Mizutani | G05B 19/4015 409/132 |
| 2004/0250665 A1 * | 12/2004 | Miyazawa | B24B 13/046 82/1.11 |
| 2007/0275860 A1 * | 11/2007 | Sennyu | H05H 7/20 505/400 |
| 2009/0215631 A1 * | 8/2009 | Singer | H01P 11/008 505/480 |
| 2011/0130294 A1 | 6/2011 | Saito et al. | |

FOREIGN PATENT DOCUMENTS

| | | |
|---|---|---|
| JP | 8-216013 | 8/1996 |
| JP | 9-180899 | 7/1997 |
| JP | 11-48002 | 2/1999 |
| JP | 2000-260599 | 9/2000 |
| JP | 2000-348900 | 12/2000 |
| JP | 2003-036999 | 2/2003 |
| JP | 2003-37000 | 2/2003 |
| JP | 2006-318890 | 11/2006 |
| JP | 2009-119546 | 6/2009 |
| JP | 2011-167709 | 9/2011 |
| JP | 2011-238517 | 11/2011 |
| WO | 2010/016337 | 2/2010 |
| WO | 2011/142348 | 11/2011 |

OTHER PUBLICATIONS

International Search Report dated Nov. 13, 2012 in International Application No. PCT/JP2012/070102.
Written Opinion of the International Searching Authority dated Nov. 13, 2012 in International Application No. PCT/JP2012/070102.
Tamao Higuchi, "Atarashii Kikai Kenma to Denkai Kenma ni yoru Suiso Kuzo o Okosanai Chodendo Kudo no Hyomen Shoriho no Kaihatsu" ILC-Tamawo Higuchi's PhD Thesis, 2002.
Decision to Grant a Patent dated Aug. 4, 2015 in corresponding Japanese patent application No. 2011-175939.

* cited by examiner

PROCESSING APPARATUS AND PROCESSING METHOD

TECHNICAL FIELD

The present invention relates to a processing apparatus and a processing method with which a superconducting-acceleration-cavity member is formed by processing an object-to-be-cut.

BACKGROUND ART

A superconducting acceleration system is an apparatus that imparts kinetic energy to charged particles and is provided with a hollow superconducting acceleration cavity. A superconducting acceleration cavity has a shape in which large-diameter portions and small-diameter portions are alternately repeated in the longitudinal direction and is formed by welding together blanks made of pure niobium after subjecting them to press molding and cutting processing.

In Patent Literatures 1 and 2, a plurality of half cells 11 that have a large diameter at one end and a small diameter at the other end are connected together in the longitudinal direction to form a cavity main unit 1. In Patent Literature 3, dumbbell cells having a dumbbell shape in which the periphery of the center portion thereof is depressed and bowl-shaped half cells are combined and connected in the longitudinal direction to form a superconducting cavity 1.

CITATION LIST

Patent Literature

{PTL 1} Japanese Unexamined Patent Application, Publication No. 2003-36999
{PTL 2} Japanese Unexamined Patent Application, Publication No. 2003-37000
{PTL 3} Japanese Unexamined Patent Application, Publication No. 2006-318890

SUMMARY OF INVENTION

Technical Problem

To form a superconducting acceleration cavity, cutting processing is applied to large-diameter portions, small-diameter portions, and intermediate portions between the large-diameter portions and the small-diameter portions of half cells (half members) that serve as components of the acceleration cavity. The superconducting acceleration cavity requires high-precision assembly in order to ensure high enough performance during use. Accordingly, there are cases in which the degree of parallelism between the two end surfaces of the half cells needs to be kept at, for example, 0.1 mm or less. Because the half cells are made of pure niobium, they are soft, having high ductility. Furthermore, because the half cells are press molded components, they have variability with respect to the shape precision thereof.

Therefore, when there are a plurality of portions-to-be-cut, and the portions-to-be-cut in a half cell are changed, it is desirable that the position of the object-to-be-cut does not shift before starting to cut another portion-to-be-cut after completing cutting of one portion-to-be-cut.

In Patent Literature 3, the center portion of a cylindrical member is depressed by using a metal mold to form a dumbbell-shaped dumbbell cell. However, it is difficult to apply machining such as cutting processing or the like to the depressed center portion, which makes it impossible to form a high-precision superconducting acceleration cavity.

The present invention has been conceived in light of the above-described circumstances, and an object thereof is to provide a processing apparatus and a processing method with which it is possible to process an object-to-be-cut with ease and it is possible to form a high-precision superconducting acceleration cavity.

Solution to Problem

In order to solve the above-described problems, a processing apparatus and a processing method of the present invention employ the following solutions.

Specifically, a processing apparatus according to an aspect of the present invention is a processing apparatus that forms an acceleration cavity member by processing a hollow object-to-be-cut, one end of which serves as a large-diameter portion and the other end of which serves as a small-diameter portion, the processing apparatus including a securing jig that secures the object-to-be-cut; a rotational drive portion that rotates the securing jig; and a cutting tool that cuts the object-to-be-cut, wherein the securing jig is formed of a plurality of members, when cutting a first portion-to-be-cut of the object-to-be-cut, the plurality of members are combined in a first pattern so that the first portion-to-be-cut is exposed; when cutting a second portion-to-be-cut of the object-to-be-cut, the plurality of members are combined in a second pattern, which is different from the first pattern, so that the second portion-to-be-cut is exposed, and the combination of the plurality of members is changed from the first pattern to the second pattern without removing the object-to-be-cut.

With the above-described aspect, the object-to-be-cut is secured by the securing jig, and the object-to-be-cut secured by the securing jig is rotated by the rotational drive portion. By using the cutting tool on the object-to-be-cut that is rotating, the object-to-be-cut is processed, and the acceleration cavity member is formed. At this time, in the case of processing an object-to-be-cut in which the plurality of portions-to-be-cut exist, a plurality of members of the securing jig are combined in different patterns in accordance with the portions-to-be-cut. Because the securing jig secures the object-to-be-cut so that the portions-to-be-cut are exposed, by appropriately combining the plurality of members, it is possible to reliably secure the object-to-be-cut while cutting the portions-to-be-cut. Because the combination of the plurality of members can be changed without removing the object-to-be-cut, it is possible to cut the plurality of portions-to-be-cut without changing the position of the object-to-be-cut, which makes it possible to enhance the shape precision and the processing efficiency.

A processing apparatus according to an aspect of the present invention is a processing apparatus that forms a half member of an acceleration cavity portion by processing a hollow object-to-be-cut, one end of which serves as a large-diameter portion and the other end of which serves as a small-diameter portion, the processing apparatus including a securing jig that secures the object-to-be-cut by sucking an inner surface of the object-to-be-cut and so that the portion-to-be-cut of the object-to-be-cut is exposed; a rotational drive portion that rotates the securing jig; and a cutting tool that cuts the object-to-be-cut.

With the above-described aspect, the object-to-be-cut is secured to the securing jig by being sucked at the inner surface thereof, and the object-to-be-cut secured to the securing jig is rotated by the rotational drive portion. Because the portion-to-be-cut is exposed, by using the cutting tool on the object-to-be-cut that is rotating, the object-to be cut is processed, and the acceleration cavity member is formed. Because the object-to-be-cut is supported on the inner surface side, it is possible to cut a plurality of portions-to-be-cut without removing the object-to-be-cut and while keeping the position of the object-to-be-cut fixed, which makes it possible to enhance the shape precision and the processing efficiency.

A processing method according to an aspect of the present invention is a processing method employing a processing apparatus that forms an acceleration cavity member by processing a hollow object-to-be-cut, one end of which serves as a large-diameter portion and the other end of which serves as a small-diameter portion, the processing method including a step of securing the object-to-be-cut with a securing jig formed of a plurality of members; a step of rotating the securing jig with a rotational drive portion; and a step of cutting the object-to-be-cut with a cutting tool, wherein the step of securing the object-to-be-cut includes a step of, when cutting a first portion-to-be-cut of the object-to-be-cut, combining the plurality of members in a first pattern so that the first portion-to-be-cut is exposed, and a step of, when cutting a second portion-to-be-cut of the object-to-be-cut, combining the plurality of members in a second pattern, which is different from the first pattern, so that the second portion-to-be-cut is exposed, and wherein the combination of the plurality of members is changed from the first pattern to the second pattern without removing the object-to-be-cut.

A processing method according to an aspect of the present invention is a processing method employing a processing apparatus that forms a half member of an acceleration cavity portion by processing a hollow object-to-be-cut, one end of which serves as a large-diameter portion and the other end of which serves as a small-diameter portion, the processing method including a step of securing the object-to-be-cut with the securing jig by sucking an inner surface of the object-to-be-cut so that the portion-to-be-cut of the object-to-be-cut is exposed; a step of rotating the securing jig with a rotational drive portion; and a step of cutting the object-to-be-cut with a cutting tool.

Advantageous Effects of Invention

With the above-described aspects, it is possible to process an object-to-be-cut with ease, and it is possible to form a high-precision superconducting acceleration cavity.

DESCRIPTION OF EMBODIMENTS

Embodiments according to the present invention will be described below with reference to the drawings.

First Embodiment

A first embodiment of the present invention will be described below.

Figure 1:
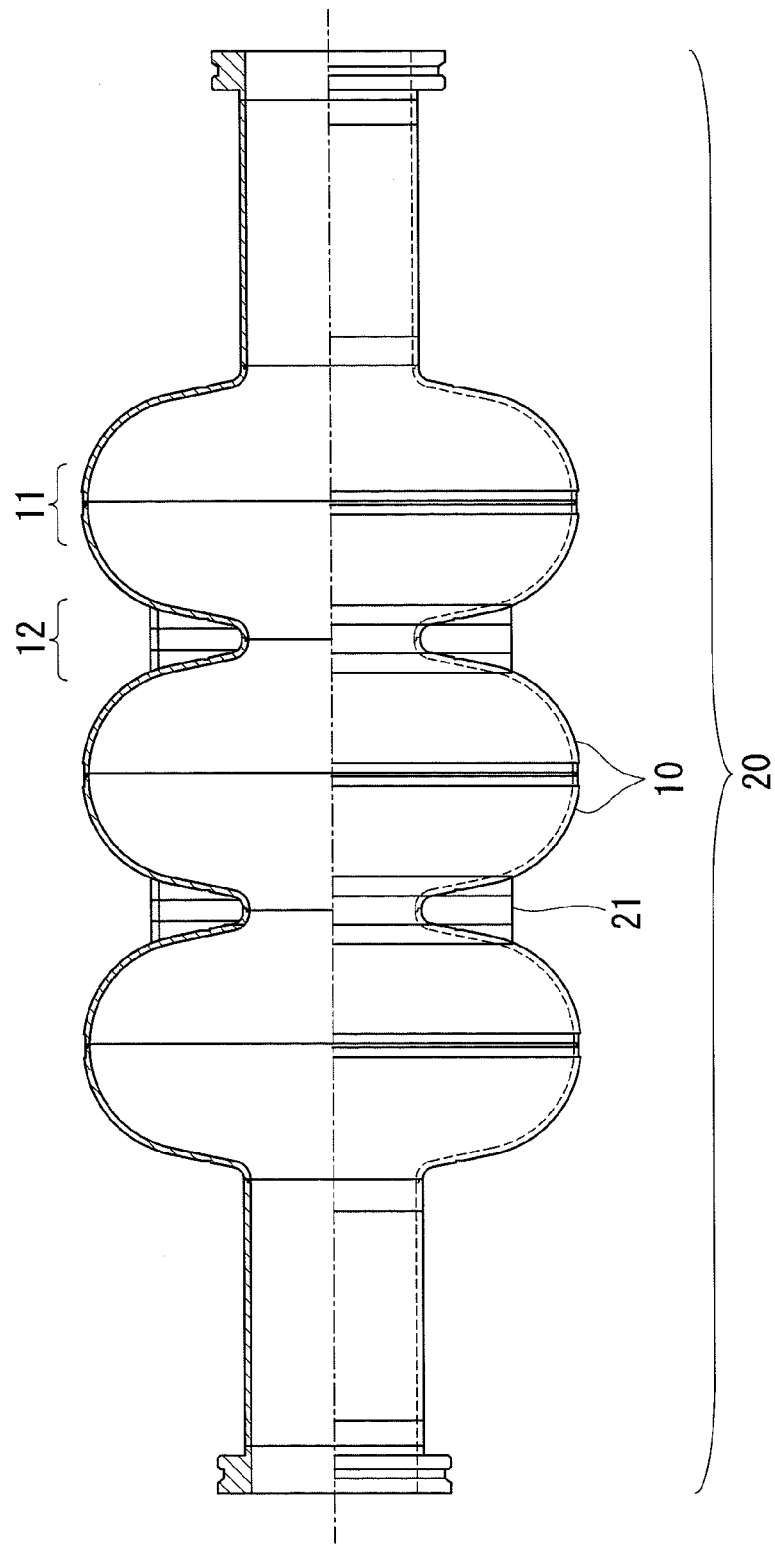
FIG. 1 is a cross-sectional view of a superconducting acceleration cavity.
Figure 2:
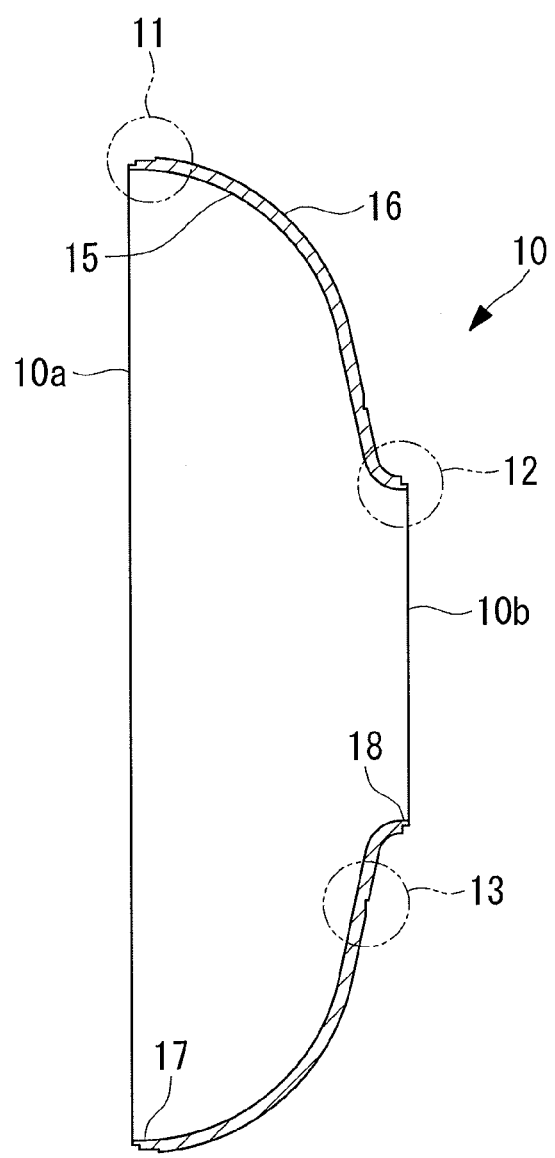
FIG. 2 is a longitudinal cross-sectional view of a half cell of a superconducting-acceleration-cavity member.
Figure 3:
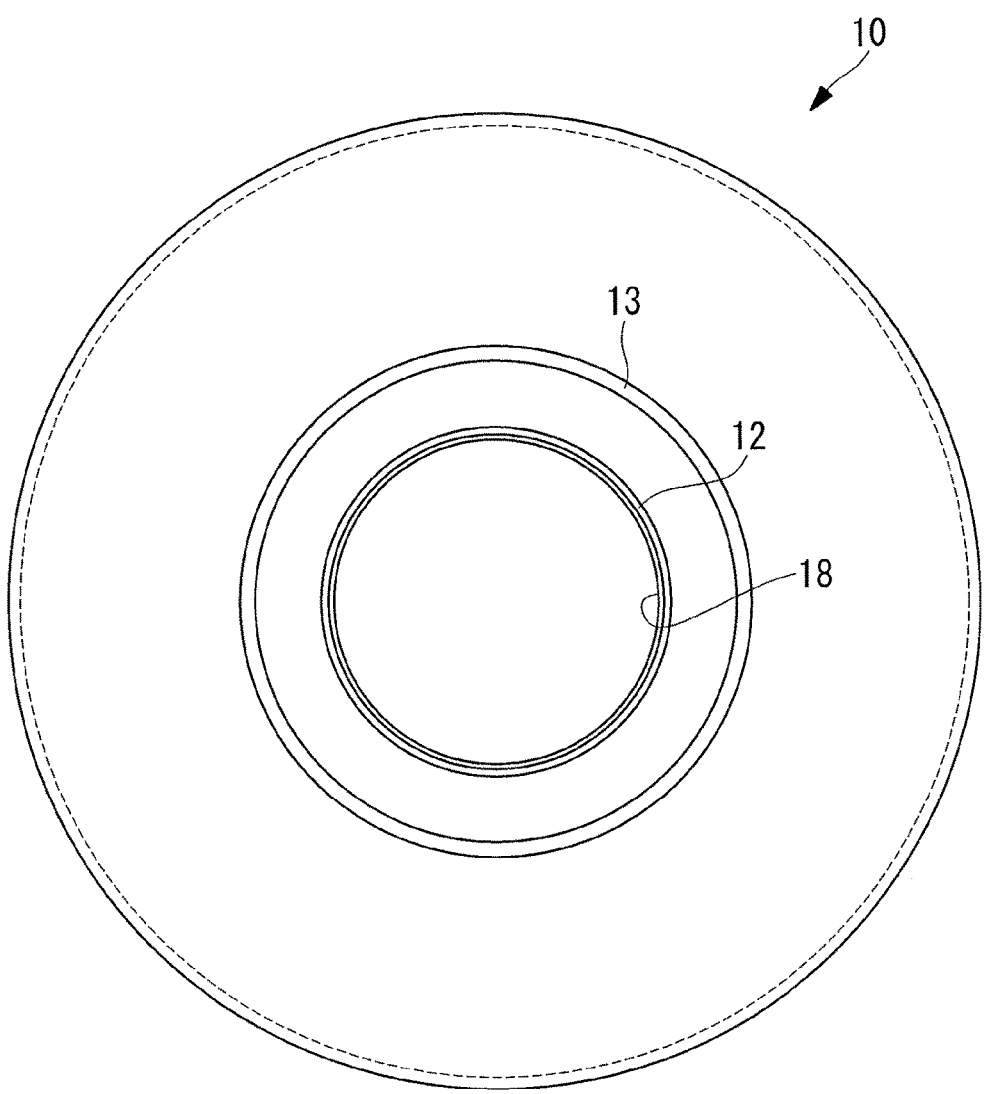
FIG. 3 is a front view of the half cell of the superconducting-acceleration-cavity member.

First, a superconducting acceleration cavity 20 employed in a superconducting acceleration system will be described. A superconducting acceleration system is an apparatus that imparts kinetic energy to charged particles and is provided with the hollow-tubular superconducting acceleration cavity 20, as shown in FIG. 1. The superconducting acceleration cavity 20 has a shape in which large-diameter portions 11 (equator portions) and small-diameter portions 12 (iris portions) are alternately repeated in the longitudinal direction, and is formed by combining a plurality of half cells 10, as shown in FIGS. 2 and 3.

The half cell 10 is formed by press molding a blank made of pure niobium. The half cell 10 has a large-diameter portion 11 at one end 10a and a small-diameter portion 12 at the other end 10b. An opening 17 is formed at the large-diameter portion 11, and an opening 18 is formed at the small-diameter portion 12. A curved-surface shape is formed between the large-diameter portion 11 and the small-diameter portion 12, and an intermediate portion thereof has a stiffening-ring securing portion 13.

Two half cells 10 adjacent to each other are welded together at the large-diameter portions 11 or at the small-diameter portions 12 to form the superconducting acceleration cavity 20. Stiffening rings 21 are inserted between the two half cells 10, thus maintaining the shape of the half cells 10. The stiffening rings 21 are welded to the stiffening-ring securing portions 13. Inlay joints (mating structures) are formed between the large-diameter portions 11 and small-diameter portions 12, and they are secured so as not to move in a radial direction with respect to the large-diameter portions 11 and the small-diameter portions 12 of adjacent half cells 10.

Figure 4:
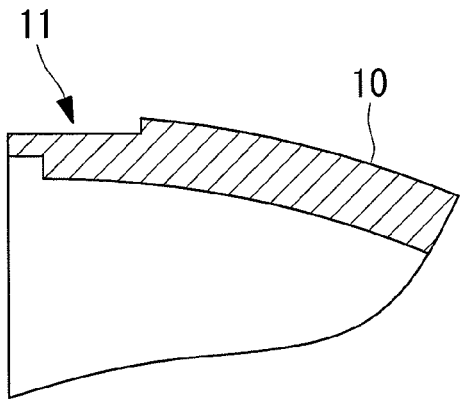
FIG. 4 is a partially-enlarged cross-sectional view of a large-diameter portion of the half cell.
Figure 5:
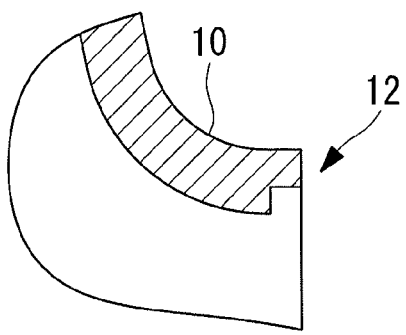
FIG. 5 is a partially-enlarged cross-sectional view of a small-diameter portion of the half cell.
Figure 7:
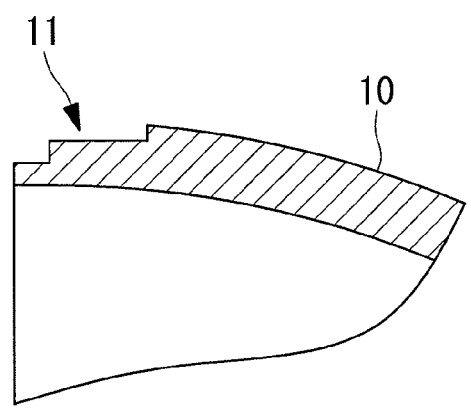
FIG. 7 is a partially-enlarged cross-sectional view of the large-diameter portion of the half cell.
Figure 8:
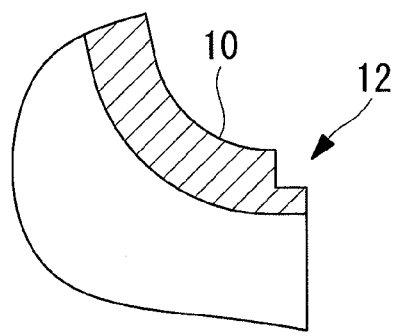
FIG. 8 is a partially-enlarged cross-sectional view of the small-diameter portion of the half cell.

For example, as in the combination shown in FIGS. 4 and 7, the large-diameter portions 11 are assembled by inserting a protrusion provided at the tip of the large-diameter portion 11 of a half cell 10 into a groove provided at the large-diameter portion 11 of another half cell 10. The small-diameter portions 12 are also assembled in accordance with the combination shown in FIGS. 5 and 8.

Figure 6:
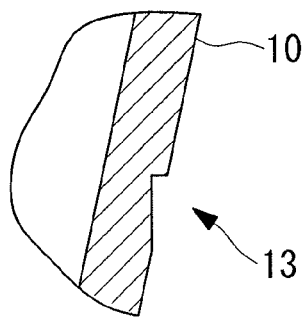
FIG. 6 is a partially-enlarged cross-sectional view of a stiffening-ring securing portion of the half cell.

The stiffening-ring securing portions 13 have step shapes that are formed at the outer surfaces of the half cells 10 having the curved-surface shapes, as shown in FIG. 6, and the stiffening rings 21 are welded thereto.

The protrusions and the grooves in the large-diameter portions 11 and the small-diameter portions 12, the step shapes of the stiffening-ring securing portions 13, and so forth are formed by cutting processing performed by using a cutting tool. A securing jig 1 employed in the cutting processing of the half cells 10 will be described below.

Figure 9:
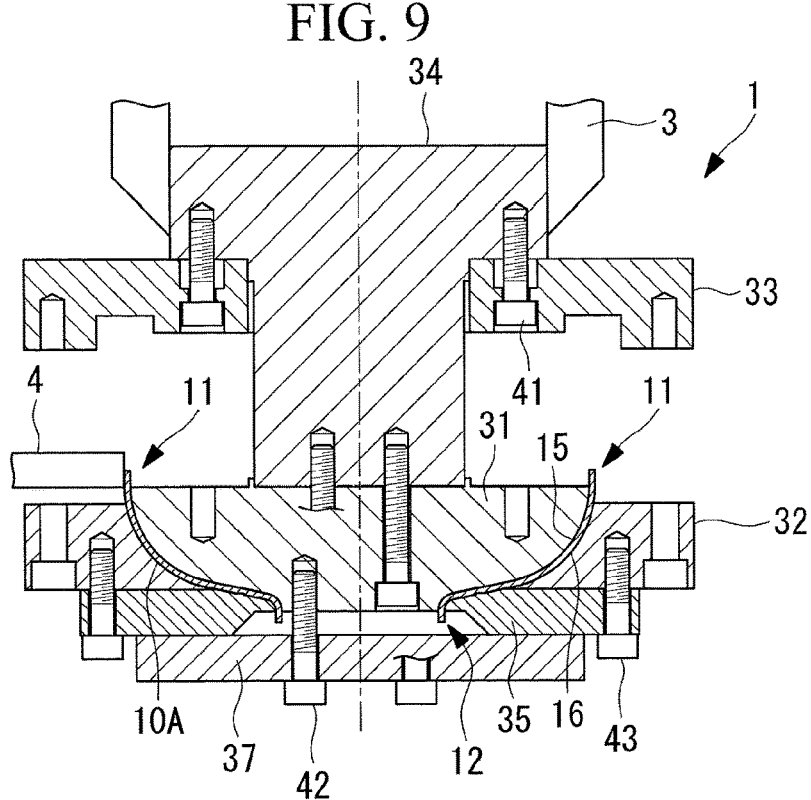
FIG. 9 is a longitudinal cross-sectional view of a securing jig according to a first embodiment of the present invention.

As shown in FIG. 9, the securing jig 1 is secured by jaws 3 of a lathe, and is rotated about an axis by a rotational drive portion (not shown). A workpiece 10A (object-to-be-cut) that will serve as a half cell 10 after processing is secured to the securing jig 1. A cutting tool 4 cuts the rotating workpiece 10A.

Figure 10:
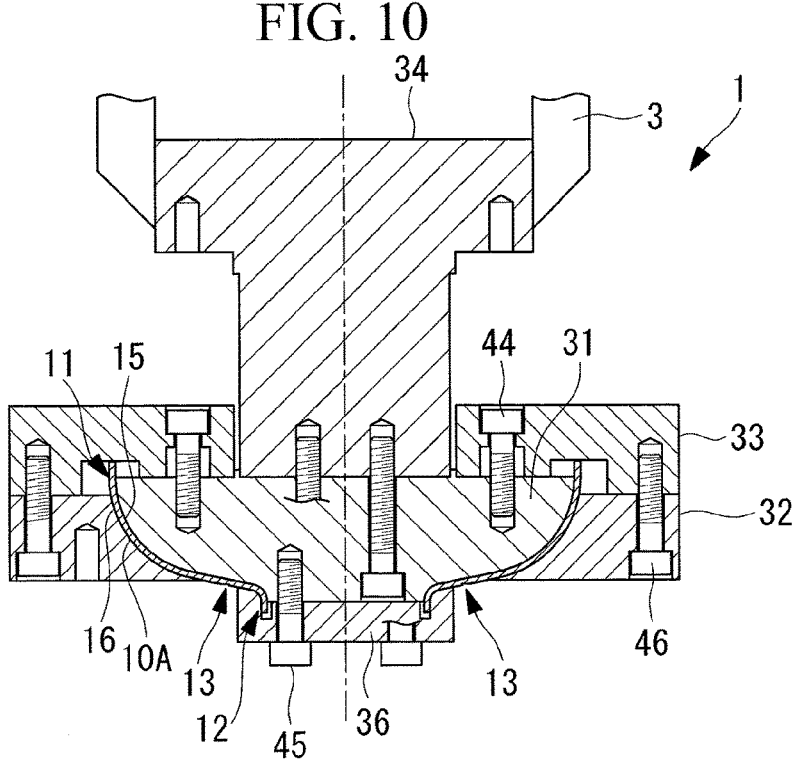
FIG. 10 is a longitudinal cross-sectional view of the securing jig according to the first embodiment.
Figure 11:
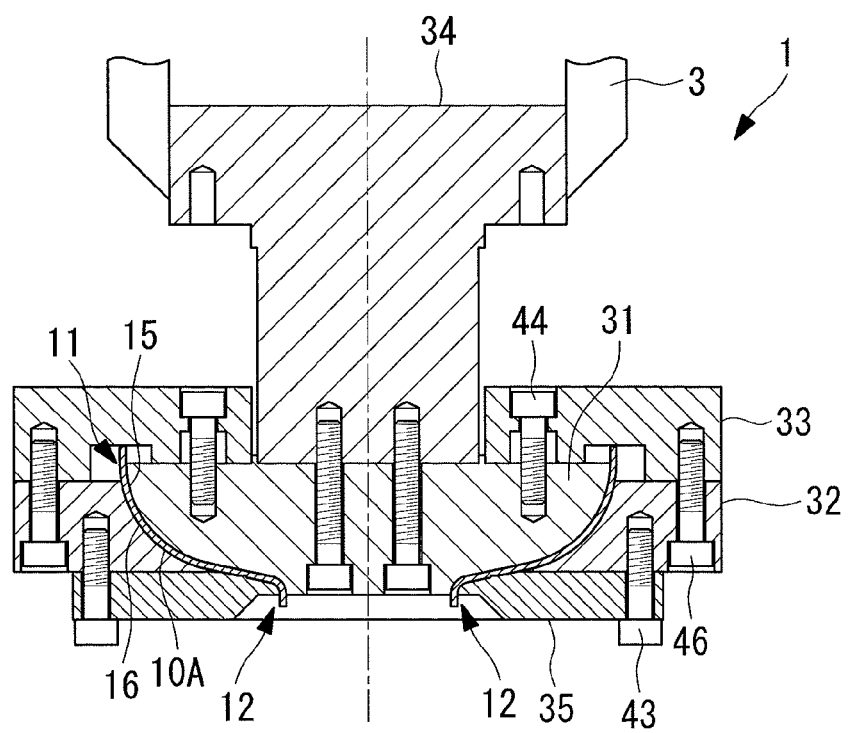
FIG. 11 is a longitudinal cross-sectional view of the securing jig according to the first embodiment.

As shown in FIGS. 9 to 11, the securing jig 1 is formed of a plurality of members. In the case of processing the workpiece 10A in which a plurality of portions-to-be-cut exist, such as the large-diameter portion 11, the small-diameter portion 12, and the stiffening-ring securing portion 13, as in the half cell 10 described above, the plurality of members of the securing jig 1 are combined in different patterns in accordance with the portions-to-be-cut. Because the securing jig 1 secures the workpiece 10A so that the portions-to-be-cut are exposed, by appropriately combining the plurality of members, it is possible to reliably secure the workpiece 10A while cutting the portions-to-be-cut. Because the combination of the plurality of members can be changed without removing the workpiece 10A, it is possible to cut the plurality of portions-to-be-cut in the workpiece 10A kept at the same position, which enhances the shape precision and the processing efficiency.

The securing jig 1 is formed of a male mold 31, a female mold 32, a first large-diameter-side clamp 33, a second large-diameter-side clamp 34, a first small-diameter-side clamp 35, a second small-diameter-side clamp 36, and a third small-diameter-side clamp 37.

As shown in FIG. 9, the second large-diameter-side clamp 34 is held between the jaws 3 of the lathe, thus securing the securing jig 1 to the lathe. The second large-diameter-side clamp 34 is a member extending in the axial direction. The male mold 31 is secured to an end portion opposite from the end portion of the second large-diameter-side clamp 34 that is held between the jaws 3. An outer surface of the male mold 31 has a curved surface that fits the shape of an inner surface 15 of the workpiece 10A. When the workpiece 10A is installed on the outer surface of the male mold 31, the female mold 32 is secured to an outer surface 16 of the workpiece 10A. The workpiece 10A is sandwiched between the male mold 31 and the female mold 32. An inner surface of the female mold 32 has a curved surface that fits the shape of the outer surface of the workpiece 10A.

For the surface of the male mold 31 that comes into contact with the workpiece 10A, a material that is softer than pure niobium, which is the raw material for workpiece 10A, for example, MC nylon (trademark), pure aluminum, aluminum alloy, or the like, is employed. By doing so, it is possible to prevent damage on the inner surface 15 of the workpiece 10A when the workpiece 10A is secured to the securing jig 1.

In the method of securing the workpiece 10A with the securing jig 1, the basic combination is that between the male mold 31 and the female mold 32 described above, and combination patterns of the securing jig 1 for processing the large-diameter portion 11, the small-diameter portion 12, and the stiffening-ring securing portion 13, will individually be described below.

First, a first combination pattern for processing the large-diameter portion 11 will be described with reference to FIG. 9. When processing the large-diameter portion 11, the securing jig 1 secures the workpiece 10A so that the large-diameter portion 11 is exposed.

The first small-diameter-side clamp 35 is installed closer to the small-diameter portion 12 of the workpiece 10A than the female mold 32 is so as also to be on the outer surface 16 of the workpiece 10A. The first small-diameter-side clamp 35 is formed so as to be depressed at the center portion thereof so that the small-diameter portion 12 of the workpiece 10A is exposed thereat. In addition, the third small-diameter-side clamp 37 is installed so as to cover the small-diameter portion 12 and so as to come into contact with a surface on the opposite side from a surface located at the side of the first small-diameter-side clamp 35 that comes into contact with the female mold 32.

The first small-diameter-side clamp 35 and the third small-diameter-side clamp 37 are secured to the male mold 31 by means of bolts 42, and the first small-diameter-side clamp 35 is secured to the female mold 32 by means of bolts 43.

With the first combination pattern described above, because the large-diameter portion 11 is exposed while the workpiece 10A is secured in the securing jig 1, it is possible to cut the large-diameter portion 11 while maintaining the shape of the workpiece 10A. In this combination pattern, the first large-diameter-side clamp 33 is moved toward the jaws 3 of the lathe and is secured to the second large-diameter-side clamp 34 by means of bolts 41 so that the first large-diameter-side clamp 33 can be secured to the workpiece 10A without removing the male mold 31 from the second large-diameter-side clamp 34 when changing to the next combination pattern.

Next, a second combination pattern for processing the small-diameter portion 12 will be described with reference to FIG. 11. When processing the small-diameter portion 12, the securing jig 1 secures the workpiece 10A so that the small-diameter portion 12 is exposed.

The first large-diameter-side clamp 33 is installed closer to the large-diameter portion 11 of the workpiece 10A than the male mold 31 is so as to cover the large-diameter portion 11. The first large-diameter-side clamp 33 is secured to the male mold 31 by means of bolts 44. Then, the female mold 32 is secured to the first large-diameter-side clamp 33 by means of bolts 46 while maintaining the position in the first combination pattern.

The third small-diameter-side clamp 37 used in the first combination pattern is removed from the male mold 31. By removing the third small-diameter-side clamp 37, the small-diameter portion 12 is exposed from between the male mold 31 and the first small-diameter-side clamp 35, which makes it possible to process the small-diameter portion 12.

With the second combination pattern described above, because the small-diameter portion 12 is exposed while the workpiece 10A is secured to the securing jig 1, it is possible to cut the small-diameter portion 12 while maintaining the shape of the workpiece 10A.

Next, a third combination pattern for processing the stiffening-ring securing portion 13 will be described with reference to FIG. 10. When processing the stiffening-ring securing portion 13, the securing jig 1 secures the workpiece 10A so that the stiffening-ring securing portion 13 is exposed.

The first small-diameter-side clamp 35 used in the second combination pattern described above is removed from the female mold 32. At this time, the female mold 32 is secured to the first large-diameter-side clamp 33 by means of the bolts 46 while maintaining its position in the second combination pattern. The first large-diameter-side clamp 33 is secured to the male mold 31 by means of the bolts 44 while maintaining its position in the second combination pattern.

With third combination pattern, the second small-diameter-side clamp 36 is installed on the small-diameter portion 12 so as to cover the small-diameter portion 12. The second small-diameter-side clamp 36 is provided away from the female mold 32 so that the stiffening-ring securing portion 13 is exposed, and is secured to the male mold 31 by means of bolts 45.

With the third combination pattern described above, because the stiffening-ring securing portion 13 is exposed while the workpiece 10A is secured to the securing jig 1, it is possible to cut the stiffening-ring securing portion 13 while maintaining the shape of the workpiece 10A.

As described above, when processing the workpiece 10A in this embodiment, in the case in which a plurality of portions-to-be-cut exist, such as the large-diameter portion 11, the small-diameter portion 12, and the stiffening-ring securing portion 13, it is possible to cut the plurality of portions-to-be-cut while keeping the workpiece 10A secured, thus without having to change the processing setup, which involves removing and re-securing of the workpiece 10A for each portion-to-be-cut. As a result, it is possible to increase the processing efficiency while enhancing the shape precision when forming the superconducting acceleration cavity 10 from the workpiece 10A.

In the first embodiment described above, although a case in which the combination pattern is changed in sequence to the first, the second, and the third combination patterns has been described, the present invention is not limited to this example. So long as the male mold 31 and the female mold 32 keep the workpiece 10A secured, the combination pattern can be changed in an arbitrary sequence.

Second Embodiment

Next, a securing jig 2 according to a second embodiment of the present invention will be described.

Figure 12:
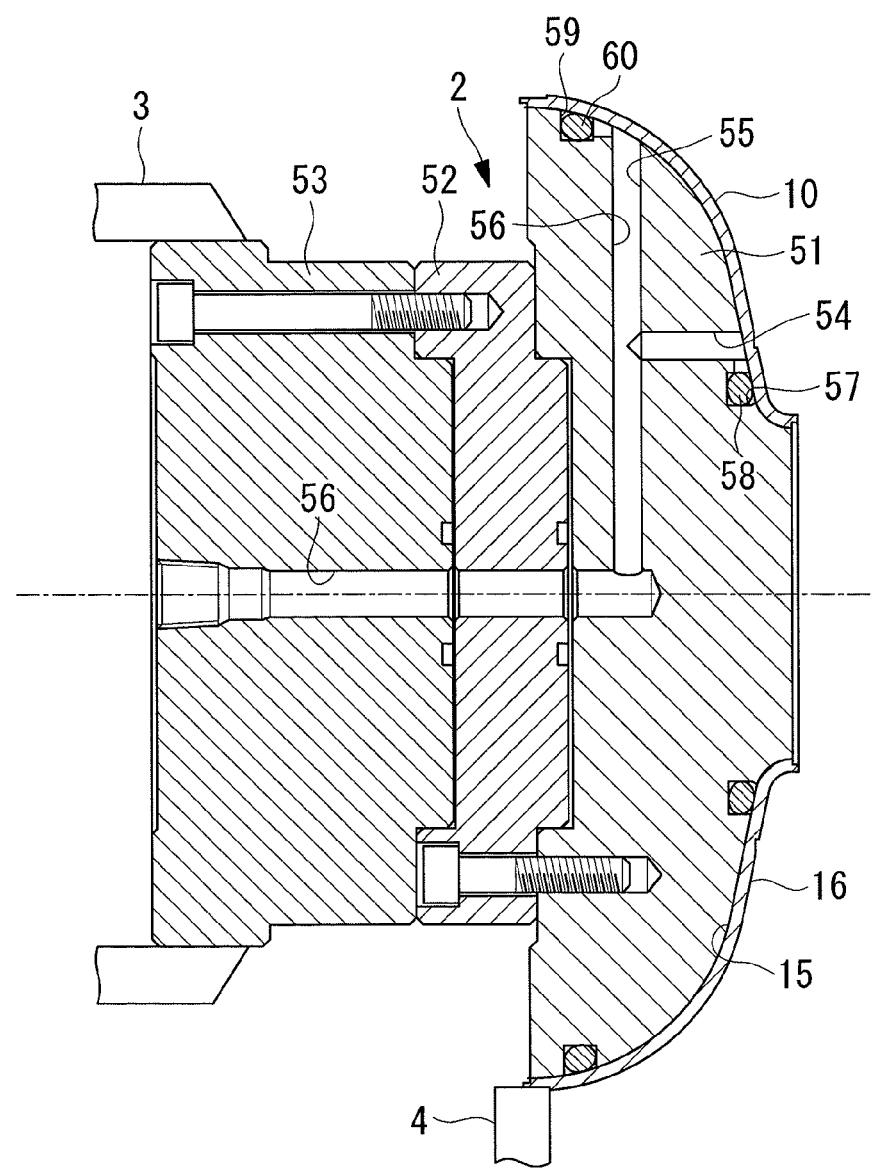
FIG. 12 is a longitudinal cross-sectional view of a securing jig according to a second embodiment of the present invention.
Figure 13:
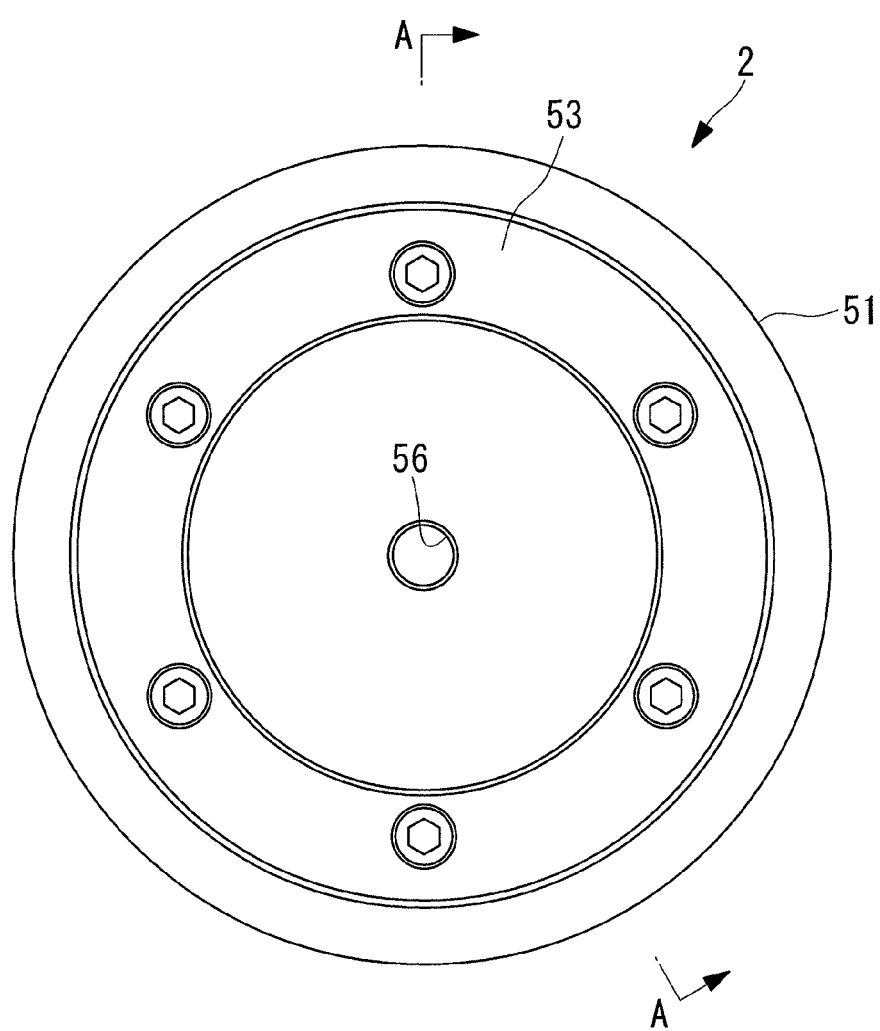
FIG. 13 is a back view of the securing jig according to the second embodiment.
Figure 14:
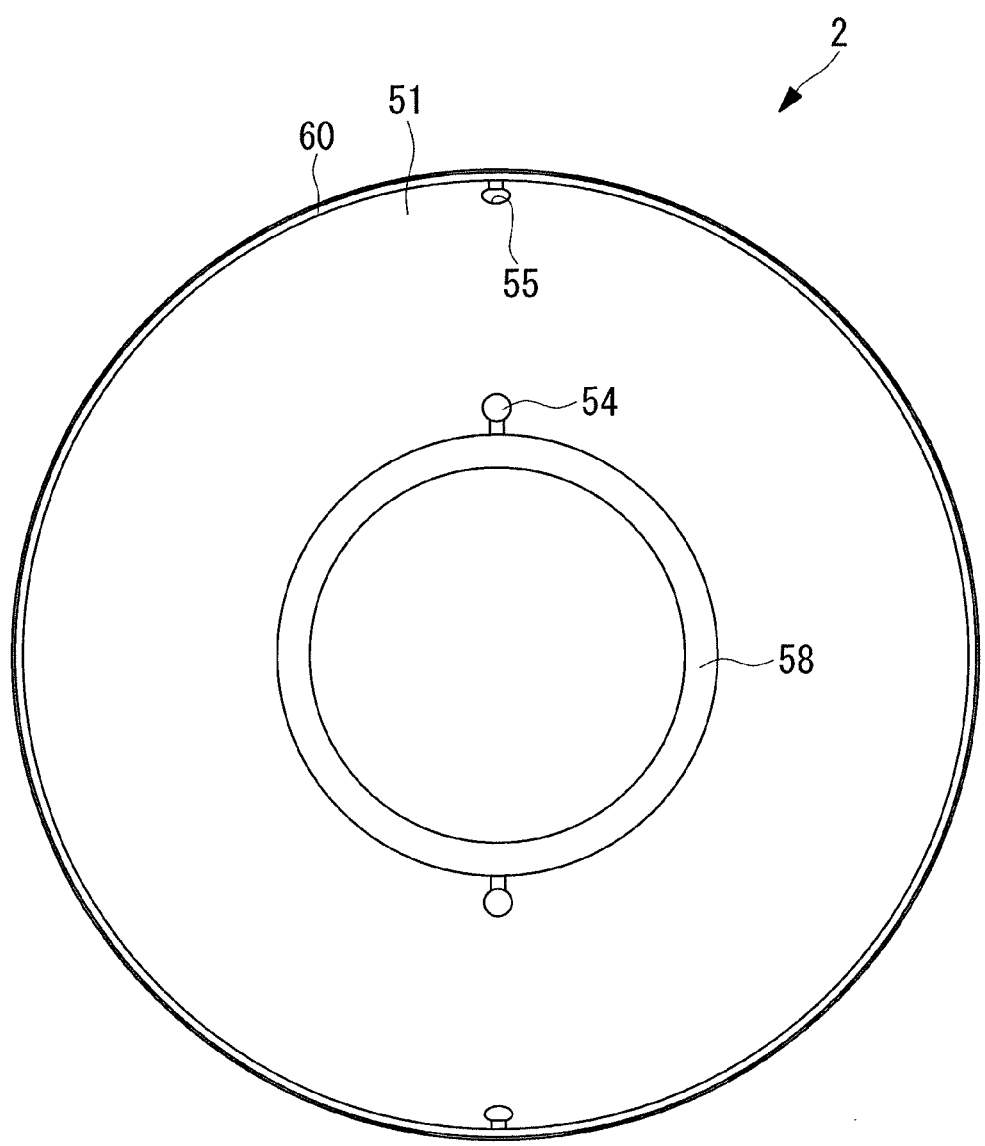
FIG. 14 is a front view of the securing jig according to the second embodiment.

As shown in FIG. 12, the securing jig 2 is secured by the jaws 3 of the lathe and is rotated about the axis by the rotational drive portion (not shown). The workpiece 10A (object-to-be-cut) that will serve as the half cell 10 after processing is secured to the securing jig 2 by means of suction. Then, the cutting tool 4 cuts the rotating workpiece 10A. FIG. 13 is a back view of the securing jig according to this embodiment, and FIG. 14 is a front view of the securing jig according to this embodiment. FIG. 12 is a cross-sectional view taken along A-A in FIG. 13.

Unlike the securing jig 1 of the first embodiment, the securing jig 2 secures the workpiece 10A only from the inner surface 15 side of the workpiece 10A, and clamps or the like for securing the workpiece 10A are not installed at the outer surface 16 of the workpiece 10A. Because of this, the large-diameter portion 11, the small-diameter portion 12, and the stiffening-ring securing portion 13, which are the portions-to-be-cut, are constantly exposed during processing.

The securing jig 2 is formed of, for example, a plurality of members, such as a first member 51, a second member 52, and a third member 53. The respective members are secured to each other by means of bolts. Suction channels 56 for sucking air from the workpiece 10A side and externally exhausting the air are provided in the interior of the respective members.

The outer surface of the first member 51 has a curved surface that fits the inner surface 15 of the workpiece 10A. For the outer surface of the first member 51 that comes into contact with the workpiece 10A, a material that is softer than pure niobium, which is the raw material for the workpiece 10A, for example, MC nylon (trademark), pure aluminum, aluminum alloy or the like, is employed. By doing so, it is possible to prevent damage on the inner surface 15 of the workpiece 10A when the workpiece 10A is secured to the securing jig 2 by means of suction.

Figure 15:
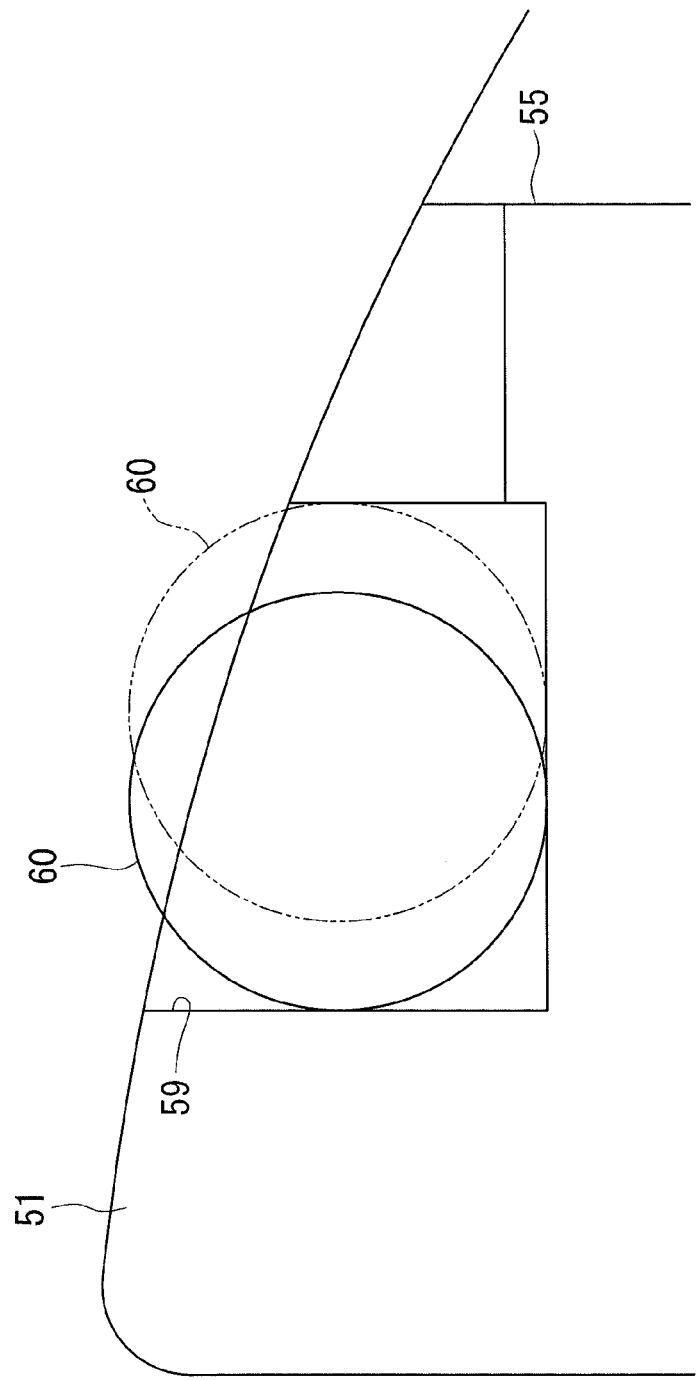
FIG. 15 is a front view of an O-ring groove of the securing jig according to the second embodiment.

An opening portion 54 and an opening portion 55 that are connected to the suction channels 56 are formed at the outer surface of the first member 51. As shown in FIGS. 12 and 14, O-ring grooves 57 and 59, to which the respective opening portions 54 and 55 are directly connected, are formed at the outer surface of the first member 51. By connecting the opening portions 54 and 55 and the O-ring grooves 57 and 59, air in the O-ring grooves 57 and 59 is sucked and externally exhausted. O-rings 58 and 60 are installed in the O-ring grooves 57 and 59. FIG. 15 shows an example of the case in which the O-ring 60 is installed in the O-ring groove 59.

The opening portion 54 is provided at the small-diameter portion 12 of the workpiece 10A, and the O-ring groove 57 is formed closer to the small-diameter portion 12 than the opening portion 54 is. The opening portion 55 is provided at the large-diameter portion 11 of the workpiece 10A, and the O-ring groove 58 is formed closer to the large-diameter portion 11 than the opening portion 55 is. It is desirable that the positions at which the O-ring grooves 57 and 59 are provided be as close to end portions 10a and 10b of the workpiece 10A as possible. By doing so, the distance between the O-rings 58 and 60 and the end portions 10a and 10b of the workpiece 10A that is supported only on one side is reduced, which makes it possible to suppress the occurrence of processing error due to vibrations during the cutting processing.

It is desirable that the O-ring grooves 57 and 59 be formed near the opening portions 54 and 55. By doing so, the O-rings 58 and 60 in the O-ring grooves 57 and 59 are deformed before the air in the space between the workpiece 10A and the first member 51 is sucked. As a result, an enclosed space is reliably formed between the workpiece 10A and the first member 51, which facilitates the generation of negative pressure between the workpiece 10A and the first member 51.

The suction channels 56 are connected to a vacuum unit (for example, Vacuum Chuck Unit Mark III made by Fuji Engineering), and the vacuum unit generates negative pressure between the workpiece 10A and the first member 51, thus securing the workpiece 10A to the first member 51.

When processing the workpiece 10A by using the securing jig 2, the vacuum unit is driven to suck the air that exists between the workpiece 10A and the first member 51, thus generating negative pressure between the workpiece 10A and the first member 51. By doing so, the workpiece 10A is secured to the first member 51. Then, the securing jig 2 is rotated by the rotational drive portion, thus rotating the workpiece 10A about the axis. By using the cutting tool 4 on the rotating workpiece 10A, the workpiece 10A is processed, and the half cell 10 is formed.

Because the workpiece 10A and the first member 51 are brought into close contact by means of vacuum suction, it is possible to prevent the position of the workpiece 10A from shifting during processing. Because the large-diameter portion 11, the small-diameter portion 12, and the stiffening-ring securing portion 13, which are the portions-to-be-cut, are constantly exposed during processing, it is possible to cut all portions-to-be-cut without having to change the processing setup. Therefore, it is possible to increase the processing efficiency while enhancing the shape precision when forming the half cell 10 from the workpiece 10A.

REFERENCE SIGNS LIST

1, 2 securing jig
3 jaws
4 cutting tool
10 half cell
10A workpiece
11 large-diameter portion
12 small-diameter portion
13 stiffening-ring securing portion
20 superconducting acceleration cavity
21 stiffening ring
31 male mold
32 female mold
33 first large-diameter-side clamp
34 second large-diameter-side clamp
35 first small-diameter-side clamp
36 second small-diameter-side clamp
37 third small-diameter-side clamp
51 first member
52 second member
53 third member
54, 55 opening portion
56 suction channel
57, 59 O-ring groove
58, 60 O-ring

The invention claimed is:

1. A processing apparatus that forms an acceleration cavity member by processing a hollow object-to-be-cut, one end of which serves as a large-diameter portion and the other end of which serves as a small-diameter portion, the processing apparatus comprising:
a securing jig that secures the object-to-be-cut;
a rotational drive portion that rotates the securing jig; and
a cutting tool that cuts the object-to-be-cut,
wherein the securing jig is formed of a plurality of members,
when cutting a first portion-to-be-cut of the object-to-be-cut, the plurality of members are combined in a first pattern so that the first portion-to-be-cut is exposed;
when cutting a second portion-to-be-cut of the object-to-be-cut, the plurality of members are combined in a second pattern, which is different from the first pattern, so that the second portion-to-be-cut is exposed, and
the combination of the plurality of members is changed from the first pattern to the second pattern without removing the object-to-be-cut from the securing jig.

2. A processing apparatus that forms a half member of an acceleration cavity portion by processing a hollow object-to-be-cut, one end of which serves as a large-diameter portion and the other end of which serves as a small-diameter portion, the processing apparatus comprising:
a securing jig having a curved outer surface that secures the object-to-be-cut by sucking an inner surface of the object-to-be-cut, which is an opposite surface of a portion-to-be-cut, so that the portion-to-be-cut of the object-to-be-cut is exposed;
a rotational drive portion that rotates the securing jig; and
a cutting tool that cuts the object-to-be-cut,
wherein, on the outer surface, two O-rings are provided, one of which is provided at a portion which comes into contact with the large-diameter portion and the other of which is provided at a portion which comes into contact with the small-diameter portion, and an opening portion that sucks the object-to-be-cut is formed between the two O-rings.

3. A processing method employing a processing apparatus that forms an acceleration cavity member by processing a hollow object-to-be-cut, one end of which serves as a large-diameter portion and the other end of which serves as a small-diameter portion, the processing method comprising:
a step of securing the object-to-be-cut with a securing jig formed of a plurality of members;
a step of rotating the securing jig with a rotational drive portion; and
a step of cutting the object-to-be-cut with a cutting tool,
wherein the step of securing the object-to-be-cut includes:
a step of, when cutting a first portion-to-be-cut of the object-to-be-cut, combining the plurality of members in a first pattern so that the first portion-to-be-cut is exposed, and
a step of, when cutting a second portion-to-be-cut of the object-to-be-cut, combining the plurality of members in a second pattern, which is different from the first pattern, so that the second portion-to-be-cut is exposed, and
wherein the combination of the plurality of members is changed from the first pattern to the second pattern without removing the object-to-be-cut from the securing jig.

4. A processing method employing a processing apparatus that forms a half member of an acceleration cavity portion by processing a hollow object-to-be-cut, one end of which serves as a large-diameter portion and the other end of which serves as a small-diameter portion, the processing method comprising:
a step of securing the object-to-be-cut with a securing jig by bringing a curved outer surface of the securing jig, which comes into contact with the object-to-be-cut, into contact with an inner surface of the object-to-be-cut, which is an opposite surface of a portion-to-be-cut so that the portion-to-be-cut of the object-to-be-cut is exposed;
a step of rotating the securing jig with a rotational drive portion;
a step of cutting the object-to-be-cut with a cutting tool and
a step of providing, on the outer surface, two O-rings, one of which is provided at a portion which comes into contact with the large-diameter portion and the other of which is provided at a portion which comes into contact with the small-diameter portion,
wherein the step of securing the object-to-be-cut secures the object-to-be-cut by sucking the inner surface of the object-to-be-cut by means of an opening portion formed between the two O-rings on the outer surface.

* * * * *